（12） United States Patent
Wingkono et al.

(10) Patent No.: US 9,056,515 B2
(45) Date of Patent: Jun. 16, 2015

(54) PAPER ENHANCEMENT TREATMENT WITH DECREASED CALCIUM CHLORIDE

(75) Inventors: Gracy A. Wingkono, San Diego, CA (US); John L. Stoffel, San Diego, CA (US); Xiaogi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/876,834

(22) PCT Filed: Oct. 29, 2010

(86) PCT No.: PCT/US2010/054769
§ 371 (c)(1),
(2), (4) Date: Mar. 28, 2013

(87) PCT Pub. No.: WO2012/057790
PCT Pub. Date: May 3, 2012

(65) Prior Publication Data
US 2013/0224450 A1   Aug. 29, 2013

(51) Int. Cl.
*D06M 11/55* (2006.01)
*D21H 19/12* (2006.01)
*D21H 21/16* (2006.01)
*D21H 21/38* (2006.01)
*B41M 5/52* (2006.01)
*D21H 21/28* (2006.01)
*C09D 1/00* (2006.01)
*D21H 19/64* (2006.01)
*D21H 19/44* (2006.01)
*D21H 17/66* (2006.01)

(52) U.S. Cl.
CPC ....... *B41M 5/5218* (2013.01); *Y10T 428/24893* (2015.01); *D21H 19/44* (2013.01); *D21H 21/16* (2013.01); *D21H 21/28* (2013.01); *C09D 1/00* (2013.01); *D21H 17/66* (2013.01); *D21H 19/64* (2013.01)

(58) Field of Classification Search
CPC ....... D06M 11/55; D21H 19/12; D21H 21/16; D21H 21/38
USPC ........................................ 106/286.6; 8/119
See application file for complete search history.

(56) References Cited

U.S. PATENT DOCUMENTS

| | | | |
|---|---|---|---|
| 1,871,647 A | 8/1932 | Alden | |
| 2,189,807 A | 2/1940 | Lenher et al. | |
| 3,891,397 A * | 6/1975 | Fiedelman | 23/300 |
| 4,692,408 A * | 9/1987 | Banks et al. | 435/104 |
| 5,057,405 A * | 10/1991 | Shiba et al. | 430/505 |
| 5,429,797 A * | 7/1995 | Camiener | 422/1 |
| 5,466,680 A * | 11/1995 | Rudy | 514/57 |
| 5,900,116 A | 5/1999 | Nagan | |
| 6,207,258 B1 | 3/2001 | Varnell | |
| 7,553,395 B2 | 6/2009 | Stoffel et al. | |
| 7,582,188 B2 | 9/2009 | Stoffel et al. | |
| 2003/0102097 A1 | 6/2003 | Moffett | |
| 2005/0006043 A1 | 1/2005 | Vinson et al. | |
| 2006/0228499 A1 | 10/2006 | Tran et al. | |
| 2006/0233975 A1 | 10/2006 | Tran et al. | |
| 2007/0087138 A1 | 4/2007 | Koenig et al. | |
| 2008/0017337 A1 | 1/2008 | Duggirala et al. | |
| 2008/0081203 A1 | 4/2008 | Knight et al. | |
| 2008/0180502 A1 | 7/2008 | Tran et al. | |
| 2008/0290320 A1 | 11/2008 | Iu et al. | |
| 2009/0035478 A1 | 2/2009 | Zhou et al. | |

FOREIGN PATENT DOCUMENTS

| | | |
|---|---|---|
| CA | 1119358 A1 | 3/1982 |
| CN | 2102308 U | 4/1992 |
| EP | 0534428 A2 | 3/1993 |
| GB | 661913 | 11/1951 |
| JP | 61170748 A | 8/1986 |
| JP | 2001512065 | 8/2001 |
| JP | 2005320651 | 11/2005 |
| JP | 2006274449 | 10/2006 |
| JP | 2009087948 A | 4/2009 |
| JP | 2010516524 | 5/2010 |
| WO | WO-94/08086 A1 | 4/1994 |
| WO | WO-2004106633 A1 | 12/2004 |
| WO | WO-2007077187 A1 | 7/2007 |
| WO | WO-2009110910 A1 | 9/2009 |
| WO | WO-2009145762 A1 | 12/2009 |
| WO | WO-2009145790 A1 | 12/2009 |
| WO | WO-2009157952 A1 | 12/2009 |
| WO | WO-2010068193 A1 | 6/2010 |

OTHER PUBLICATIONS

Thompson et al., "Paper Machine Corrosion and Progressive Closure of the White Water System," 1996 Papermakers Conference, Philadelphia, PA, Mar. 24-27, 1996, pp. 207-216.
HPDC, Int'l Search Report & Written Opinion dated Jul. 28, 2011, PCT App. No. PCT/US2010/054769, 9 p.
HPDC, EPO Search Report dated Dec. 6, 2013. EPO App. No. 10859101.7, 6 p.

* cited by examiner

*Primary Examiner* — Peter F Godenschwager
(74) *Attorney, Agent, or Firm* — Conley Rose, P.C.

(57) ABSTRACT

An inkjet printable media comprises a paper base containing a surface coating comprising calcium chloride and a synergistic amount of a sulfate salt. When the printable media is printed with an inkjet ink containing a black pigment, a KOD value of the printed media is equal to or greater than that of a comparative inkjet printed media comprising up to 12 kg calcium chloride/T media and lacking the sulfate salt.

6 Claims, 2 Drawing Sheets

PAPER ENHANCEMENT TREATMENT WITH DECREASED CALCIUM CHLORIDE

CROSS-REFERENCE TO RELATED APPLICATION

The present application is the U.S. National Stage under 35 U.S.C. §371 of International Patent Application No. PCT/US2010/054769, filed 29 Oct. 2010, the disclosure of which is hereby incorporated herein by reference.

BACKGROUND

In paper milling operations, calcium chloride is commonly used as a colorant fixative that is applied to a raw paper base in the size press process of a papermaking machine. Typically the calcium chloride is added to a surface sizing composition containing a sizing agent such as starch or a starch derivative or a water soluble polymeric material. The calcium chloride enhances the image quality of the resulting print media when printed with pigmented inks by reacting with the pigment colorants in the deposited ink. Calcium ions interact with anionic pigments, and in this way the pigment colorant is made to stay on the outermost portion or surface of the print media, which increases the optical density of the image on the media and also reduces the dry time of the deposited ink. In order to obtain satisfactory print quality (PQ), the concentration of calcium chloride in a print media is typically about 6-8 Kg/T (ton) of paper. In some cases the calcium chloride loading is up to 12 Kg/T of paper. However, such high loadings of chloride-containing compounds can promote corrosion of the paper milling equipment used to produce the print media. In some cases the use of calcium chloride-containing treatment compositions reduces the life span of the non-stainless-steel-corrosion-resistant grade parts that are contacting with salt of the paper manufacturing equipment, such as sizing rolls for instance. The promotion of corrosion by paper treatment chemicals is particularly challenging in commercial paper manufacturing processes that operate as "closed loop" mills with lower consumption of fresh water.

There is continuing interest in the development of ways to produce print media that perform well with pigmented inks, particularly in the field of inkjet printing.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
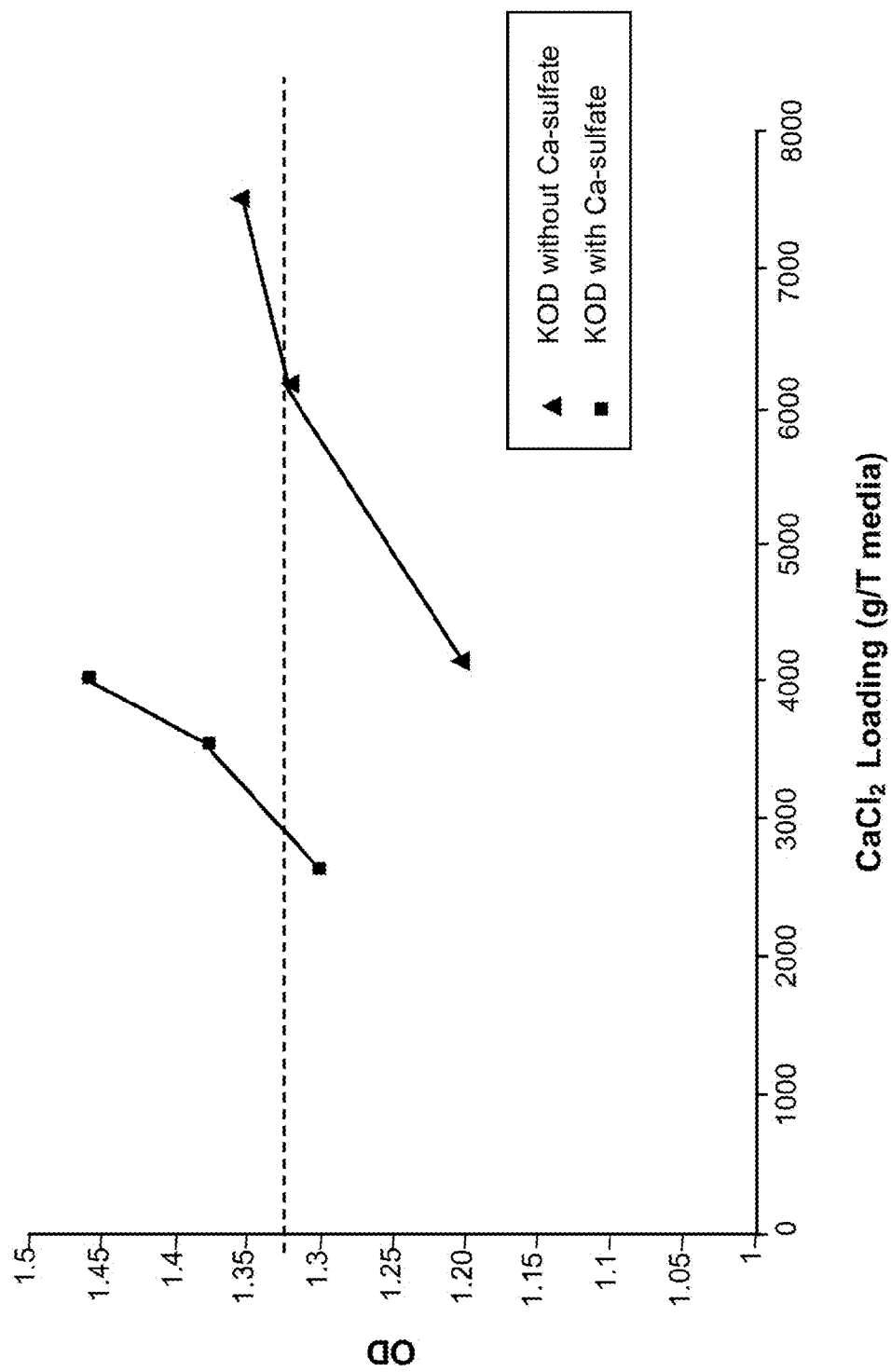
FIG. 1 shows the KOD response to $CaCl_2$ loading with 0.1 Kg $CaSO_4$/T paper (solid squares) and without $CaSO_4$ (solid triangles)

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

The term "about" when referring to a numerical value or range is intended to encompass the values resulting from experimental error that can occur when taking measurements. Such measurement deviations are usually within plus or minus 10 percent of the stated numerical value.

The term "print quality" or "PQ" when referring to an inkjet printed image, refers to one or more of the following characteristics: optical density ("print density"), color gamut, edge acuity, strikethrough, and ink dry time of the printed medium.

"Black optical density" (KOD) is the measurement of the change in reflectance $OD=\log_{10}(I_i/I_r)$, where $I_i$ and $I_r$ are incident and reflected light intensities of a black colored printed image, respectively. The higher the KOD value, the darker the black colored image obtained.

"Color gamut" refers to the subset of colors which can be accurately represented in a given circumstance, such as within a given color space like CIE 1976 (L*, a*, b*) color space.

"Edge acuity" or line raggedness refers to the average of the leading edge and trailing edge raggedness of a printed line and it measures the appearance of geometric distortion of an edge from its ideal position.

"Ink dry time" refers to the time it takes for the ink to dry such that it will not smear or transfer to other surfaces.

"Image strike through" refers to an image defect in which the image printed on the first side of a print media can be seen from the opposite side. It is usually caused by poor opacity of media and/or excessive ink penetration to the opposite side.

"Crashing" or "crashes out," when referring to a pigmented ink applied to a print medium, means that stabilized suspension of pigmented colorants with aqueous solvent is disturbed and pigment particles are precipitated from suspension.

"Paper," "paper substrate," "print media," "paper stock" or "base stock" includes traditional papers such as woody paper, non-woody paper; synthetic paper, and regenerated paper. More generally, these terms are meant to encompass a substrate based on cellulosic fibers and other known paper fibers. The substrate may be of any dimension, e.g., size or thickness, or form such as pulp, wet paper, and dry paper, for example. The substrate can be in the form of a roll and broad, or in the form of a flat or sheet structure, which may be of variable dimensions. In particular, substrate is meant to encompass plain paper or un-coated paper, writing paper, drawing paper, photobase paper, coated paper and the like. For example, a paper substrate may be from about 2 mils to about 30 mils thick, depending on a desired end application for the print medium.

The term "hardwood pulps" refers to fibrous pulp derived from the woody substance of deciduous trees (angiosperms) such as birch, oak, beech, maple, and eucalyptus.

The term "softwood pulps" refers to fibrous pulps derived from the woody substance of coniferous trees (gymnosperms) such as varieties of fir, spruce, and pine, as for example loblolly pine, slash pine, Colorado spruce, balsam fir and Douglas fir.

Temperature, ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1-10 Kg should be interpreted to include not only the explicitly recited limits of about 1 Kg to about 10 Kg, but also to include sub-ranges such as 1 to 8 Kg, 2 to 5 Kg, and so forth, as well as individual amounts, including fractional amounts, within the specified ranges, such as 2 Kg, 3.5 Kg, and 5 Kg, for example.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Surface Treatment Composition.

A feature of the disclosed compositions and treatment methods is the exclusion of any salt species with chloride anion from being used alone as a colorant fixative in an paper surface treatment composition. An improvement to conventional paper enhancement compositions is provided by combining sulfate ions with chloride ions as colorant fixatives in a paper surface treatment composition. In various compositions, one or more salts having a sulfate anion are combined with calcium chloride as colorant fixatives in a surface treatment composition. In some cases, a surface treatment composition contains a mixture of calcium sulfate and calcium chloride in the form of a water-based solution or dispersion. In many embodiments the salt with sulfate anion is calcium sulfate. In various other embodiments the salt with sulfate anion is sodium sulfate or magnesium sulfate.

In many cases the amount of calcium chloride loading is lowered by at least one half of the typical 4 to 8 Kg/T paper loading that is conventionally used. In some cases, the calcium chloride loading is advantageously reduced by more than 50% without sacrificing optical density of the printed product. In various embodiments, the chloride-containing fixative is present in an amount ranging from about 2800 ppm to about 5000 ppm, and the sulfate-containing fixative is present in an amount ranging from about 70 ppm to about 150 ppm. In many applications, a sulfate- and calcium chloride-containing surface treatment composition boosts inkjet print quality of a treated paper to a greater extent than surface treatment compositions containing calcium chloride as the only divalent salt. At the same time, in many applications, use of a disclosed surface treatment composition to surface-treat a raw paper base will help in controlling the corrosivity of white water in the paper mill because of the significantly reduced amount of chloride in the surface treatment composition. Without wishing to be limited to any particular theory to explain the beneficial effect of substituting a sulfate-containing colorant fixative for a portion of the usual chloride-containing fixative in a surface treatment composition, it is thought that a sulfate salt promotes Ca-chloride salt to be more available on the paper surface, hence with the same amount of loading, higher/better print quality can be achieved.

Surface Sizing Agents. In many cases, a surface treatment composition includes, in addition to an above-described combination of sulfate and chloride ions and water, a conventional surface sizing agent. A surface sizing agent aids in the development of resistance to penetration of liquids through the paper substrate and also improves paper surface smoothness. Some suitable surface sizing agents include, but are not limited to, starches and starch derivatives; carboxymethylcellulose (CMC); methyl cellulose; alginates; waxes; wax emulsions; alkylketene dimer (AKD); alkyl succinic anhydride (ASA); alkenyl ketene dimer emulsion (AnKD); emulsions of ASA or AKD with cationic starch; ASA incorporating alum; water-soluble polymeric materials, such as polyvinyl alcohol, gelatin, acrylamide polymers, acrylic polymers or copolymers, vinyl acetate latex, polyesters, vinylidene chloride latex, styrene-butadiene, acrylonitrile-butadiene copolymers, styrene acrylic copolymers and copolymers, and various combinations of those agents. In many applications some type of starch is used as a surface sizing agent. Examples of suitable starches are corn starch, tapioca starch, wheat starch, rice starch, sago starch and potato starch. These starch species may be unmodified starch, enzyme modified starch, thermal and thermal-chemical modified starch and chemical modified starch. Examples of chemical modified starch are converted starches such as acid fluidity starches, oxidized starches and pyrodextrins; derivatized starches such as hydroxyalkylated starches, cyanoethylated starch, cationic starch ethers, anionic starches, starch esters, starch grafts, and hydrophobic starches.

The surface sizing agents are generally used at concentration levels customary in the art of papermaking. In some instances, the surface sizing agent includes both starch and a synthetic sizing agent. For example, the pick-up amount of starch may be 0.5-6 grams per square meter (gsm)/paper side, and the amount of synthetic surface sizing agent may be in the range of 0-6 Kg/T paper side. Both internal sizing and surface sizing controls the paper's absorption capacity and absorption speed with respect to applied inks. The degree of sizing is determined primarily by the type and amount of sizing agents used for a particular application. The absorption of aqueous solvents may be characterized by Cobb size values and Bristow Wheel absorption rate, for example. To obtain an optimum result, the Cobb value typically ranges from 20 to 50 gsm in 60 seconds, preferably in the range of about 25-35 gsm. Absorption rate as measured by Bristow Wheel Dynamic Sorption Tester ranges from 5 $ml/m^2$/second to 50 $ml/m^2$/second, with a wheel speed of 1.25 mm/sec.

Other Ingredients. In addition to the required sulfate and chloride components, the treatment composition may include one or more other ingredients instead of, or in addition to, an above-described sizing agent. These ingredients include pigments, dispersants, optical brighteners, fluorescent dyes, surfactants, deforming agents, preservatives, pigments, binders, pH control agents, coating releasing agents, and any other suitable surface treatment materials that are known in the art and are compatible with the sulfate-containing component and calcium chloride. In some cases, a solubility-enhancing agent for the sulfate-containing component is included to increase the upper limit of the above-described sulfate-concentration range in the surface treatment composition. For instance, adding glycerol may increase the concentration of solubilized calcium sulfate up to about 5 wt. % of Ca-sulfate in solution at 20° C., as compared to about 0.25 wt. % of Ca-sulfate in solution without glycerol.

Method of Making Surface Treatment Compositions.

In many cases, the sulfate-chloride surface treatment compositions are made by first dissolving about 2.8 to about 5 g/100 mL of the chloride component in water. Next, about 0.2 to about 4.76 g/100 mL of the sulfate component is mixed into the chloride solution until dissolved (depending on what sulfate salt is being used). The chloride component may contain one or more chloride-containing compound. Some non-limiting examples of suitable chloride components are calcium chloride and sodium chloride. The sulfate component may contain one or more sulfate-containing compound. Some non-limiting examples of suitable sulfate-containing compounds are calcium sulfate, sodium sulfate and magnesium sulfate. In most compositions containing calcium chloride and calcium sulfate, their concentrations are in the ranges of about 2.8 to about 5 g/100 mL calcium chloride and about 0.2 to about 4.76 g/100 mL calcium sulfate. Preparation of the treatment composition is generally done at room temperature or about 25° C. Any suitable mixing equipment may be used for forming and mixing the composition.

In some cases, an oxygen-containing compound such as a polyvinyl alcohol or glycerol is dissolved in the calcium chloride solution prior to mixing and dissolving the sulfate component, to increase the solubility of the sulfate component. In many cases, one or more sizing agent is dissolved in the chloride-sulfate solution. One or more other ingredients, described above, may also be dissolved or dispersed in the chloride-sulfate solution. In some embodiments, when starch is used as a sizing agent, it is pre-cooked in water prior to combining with the other ingredients of the treatment composition. Water is added to the cooked starch to dilute the starch, and then the sulfate salt is added into the dilute starch, followed by addition of the chloride salt.

Base Paper Stock.

The paper base, stock or substrate used to make an inkjet printable paper or print media comprises any type of cellulose fiber, or combination of fibers known for use in paper making. For example, the substrate may be made from pulp fibers derived from hardwood trees, softwood trees, or a combination of hardwood and softwood trees prepared for use in papermaking fiber obtained by known digestion, refining, and bleaching operations, such as those that are customarily employed in mechanical, thermomechanical, chemical and semi-chemical, pulping or other well-known pulping processes. For some applications, all or a portion of the pulp fibers are obtained from non-woody herbaceous plants such as kenaf, hemp, jute, flax, sisal and abaca, for example. Either bleached or unbleached pulp fiber may be utilized in preparing a suitable paper base for the print media. Recycled pulp fibers are also suitable for use. In some applications, the paper base is made by combining 30% to about 100% by weight hardwood fibers and from about 0% to about 70% by weight softwood fibers.

Any of a number of fillers may be included in various amounts in the paper pulp during formation of the substrate, to control physical properties of the final substrate, depending upon the particular requirements of the user. Some suitable fillers are ground calcium carbonate, precipitated calcium carbonate, titanium dioxide, kaolin clay, and silicates, to name just a few, which may be incorporated into a pulp. For many paper base formulations the filler content of the pulp is in the range of about 0% to about 40% by weight of the dry fiber pulp. In some of those applications the filler represents about 10% to about 20% by weight of the dry fiber pulp. An exemplary inkjet printing media comprises a base stock such as a cellulose paper and a surface treatment composition applied on a single side or on both sides of the base stock. The cellulose base paper may have a basis weight ranging from about 35-250 gsm, with about 0.5 to 35% by weight of filler, for instance.

Internal Sizing of Paper Stock. For many applications at least one sizing agent is added to the pulp suspension before it is converted to a paper web or substrate, to provide internal sizing of the substrate. This internal sizing treatment helps to develop in the resulting substrate a resistance to liquids during use. During further stages of the paper making processing, the internal sizing also prevents any subsequently-applied surface sizing from soaking into the finished sheet, thereby allowing the surface sizing to remain on the surface where it has maximum effectiveness. Internal sizing agents that are suitably used for this purpose include any of those commonly used at the wet end of a paper manufacturing machine. For example, rosin; rosin precipitated with alum $(Al_2(SO_4)_3)$; abietic acid and abietic acid homologues such as neoabietic acid and levopimaric acid; stearic acid and stearic acid derivatives; ammonium zirconium carbonate; silicone and silicone-containing compounds; fluorochemicals of the general structure $CF_3(CF_2)_nR$, wherein R is anionic, cationic or another functional group; starch and starch derivatives; methyl cellulose; carboxymethylcellulose (CMC); polyvinyl alcohol; alginates; waxes; wax emulsions; alkylketene dimmer (AKD); alkenyl ketene dimer emulsion (AnKD); alkyl succinic anhydride (ASA); emulsions of ASA or AKD with cationic starch; ASA incorporating alum; and other known internal sizing agents and combinations of those. The internal sizing agents are generally used at concentration levels known to those who practice the art of paper making. For instance, in some applications the amount of internal sizing agent is in the range of about 0.3 Kg IT of base paper stock to 20 Kg /T.

Surface Treating a Base Stock.

A disclosed surface treatment composition in the form of an aqueous solution or dispersion containing a combination of sulfate and chloride ions, and, optionally, a sulfate solubilizer and/or one or more conventional surface sizing components, is applied to a base paper stock by any suitable surface size press process such as a puddle-size press and film-size press, or the like, as are known in the art of paper manufacturing. The puddle-size press may be configured as having horizontal, vertical, or inclined rollers. The film-size press may include a metering system, such as gate roll metering, blade metering, Meyer rod metering, or slot metering. In some embodiments, a film-size press with short-dwell blade metering is used as an application head to apply the surface treatment composition. For some applications, the applied weight of surface treatment composition is controlled in the range of about 0.5-6 grams per square meter (gsm) per side of paper stock (dry weight). In some cases, of this total amount, the applied weight of calcium chloride ranges from about 1 to about 8 Kg/T, and in some instances is about 2 Kg/T to about 4 Kg/T, and the applied weight of calcium sulfate ranges from greater than 0 to about 0.5 Kg/T, and in some instances is about 2 g/T to about 150 g/T. A calendaring process may be used after drying the surface treatment composition to improve surface smoothness and gloss.

In some applications it may be desirable to apply a surface sizing agent and a sulfate-chloride composition separately instead of applying them together in a single surface treatment composition as described above. In such instances, a sulfate-chloride composition and a composition containing a surface sizing agent (e.g., starch) are sequentially applied to the fiber web (paper stock) as described above, with or without drying of the fiber web between applications. In many cases, a surface treated print media provides very good printing quality when used with pigmented inks. In many cases, the resulting print media show excellent performance comparable to or better than conventional calcium chloride-containing systems, and at the same time provide lower risk for corrosion of some types of paper manufacturing equipment, and are also less exothermic during manufacture and application of the surface treatment composition.

In some embodiments, one or more salts containing sulfate anion are advantageously used as a replacement for some or all of a conventional $CaCl_2$ surface treatment composition. Calcium sulfate, for example, is non-corrosive and biodegradable, and in many cases offers the potential advantage of avoiding the paper mill equipment corrosion problems sometimes associated with use of chloride salts during manufacture of print media. In some embodiments, another potential advantage of using a sulfate-containing salt of a metal (e.g., calcium or sodium) as a colorant fixative in combination with a reduced amount of calcium chloride is the lower exothermal potential which may improve or eliminate potential high temperature concerns that commonly occur with salt mixing in paper mills. In some embodiments, another potential advantage of using a sulfate-containing salt of a metal to replace a portion of the calcium chloride typically contained in inkjet print media is more rapid ink dry times compared to many types of conventional $CaCl_2$-containing print media.

A potential advantage of many of the sulfate-chloride containing compositions and treatment methods described herein is the exclusion of any salt species with $Cl^-$ anion from being used alone in a surface treatment composition, and thereby reducing risk of corrosion from $Cl^-$ in some cases.

Surface Treated Base Paper.

In some instances the relative amounts of sulfate salt and calcium chloride in the composition are calculated to provide a weight ratio of sulfate salt to calcium chloride of about 1:28 by dry weight of the combined salts when a desired amount of the composition is applied to a raw base paper. In some cases their weight ratio is about 1:40. In some cases, the total calcium chloride loading is about 2 to about 4 Kg/T paper and the loading of calcium sulfate is 0.1 Kg/T paper.

In many cases, a surface treated paper stock provides very good printing quality when used with pigmented inks. In many cases, the resulting print media show excellent performance equal to or better than conventional calcium chloride-containing systems, and at the same time provide lower risk for corrosion of some types of paper manufacturing equipment, and are also less exothermic during manufacture and application of the surface treatment composition.

Print Media with Enhanced Print Quality.

A paper based print media having a paper substrate treated with an above-described sulfate-chloride composition contains a combined calcium chloride and calcium sulfate loading in the range of about 1 to about 9 Kg/T paper (i.e., treated paper substrate). In most cases, the concentration of the total amount of the combined sulfate and chloride salts on the dried paper is in the range of about 1 to about 6 $g/m^2$. In most cases, from about 1 to about 4 Kg/T of the combined salts is calcium chloride. For many applications, the amount of calcium sulfate is in the range of about 3 to about 4 Kg/T of the total salts. In many applications both sides of the paper substrate are surface treated with the sulfate-chloride composition, in which case the combined sulfate and chloride salt loading per side is about one-half of the aforesaid total amounts.

Inkjet Printing on Sulfate-Chloride Treated Paper.

The resulting treated printing media are suitably employed with any inkjet printer configured to use pigmented inks for any drop on demand or continuous ink jet technology, such as thermal inkjet or piezoelectric inkjet technology. Pigmented inkjet inks are well known in the art, and typically contain a liquid vehicle, pigment colorants, and additional components including one or more dyes, humectants, detergents, polymers, buffers, preservatives, and other components. A pigment or any number of pigment blends may be provided in the inkjet ink formulation to impart color to the resulting ink. The pigment may be any number of desired pigments dispersed throughout the resulting inkjet ink. More particularly, the pigment included in the present inkjet ink may include, but is not limited to, self-dispersed (surface modified) pigments, or pigments associated with a dispersant, as further described below.

The pigmented inkjet inks that may be used with an above-described sulfate-chloride treated paper substrate may contain any suitable organic or inorganic pigment particles, including black pigments, white pigments, cyan pigments, magenta pigments, yellow pigments, and the like.

In various embodiments, inks used to print on a sulfate-chloride treated paper may contain any of a wide variety of types of pigment, although some types of pigment are more dependent than others on the "crashing" effect of the salts. In general, there is an improvement in print quality with any type of pigmented ink when it is printed on a disclosed sulfate-chloride treated paper, with the differences, relative to printing on untreated paper, being primarily differences in magnitude of improvement.

The inkjet inks used to print on the sulfate-chloride treated paper may contain one or more different types of pigment. In many embodiments, the mass average diameter of the pigment particles is about 10 nm to about 10 pm, and in some cases the average diameter is in the range of about 10 nm to about 500 nm, although sizes outside these ranges may also be used if the selected pigment can remain dispersed in the ink composition and the pigment particles provide adequate color properties. In some embodiments the pigment comprises an amount in the range of about 1% to about 20% by weight of the inkjet ink composition, and in certain cases comprises an amount in the range of about 2% to about 6% by weight of the inkjet ink composition.

The pigmented inkjet inks suitable for use with the surface-treated print media described herein may additionally include any suitable vehicles or additives as are known in the art of preparing inkjet inks. Some of these include water, organic co-solvents, dye-based colorants, pH buffers, viscosity modifiers, antimicrobials, and surfactants. The pigmented inkjet inks typically have a viscosity of less than 10 cp.

Printing a Sulfate-Chloride Enhanced Paper.

A sulfate-chloride treated print media may be printed by generating marks or images on a surface of the recording sheet using any suitable inkjet printer and inkjet printing process, such as desk top ink jet printing or high speed commercial inkjet printing, for example. In some applications, a treated paper or print media as described herein is provided to an inkjet printing apparatus containing an aqueous ink, and droplets of the ink are caused to be ejected in an image wise pattern onto the print media, thereby generating images or alphanumeric characters on the ink-receiving surface of the print media. Continuous and drop-on-demand (e.g., piezoelectric and thermal) inkjet processes and apparatus are well known in the art.

In many applications, the use of a disclosed print media which is surface enhanced with an above-described sulfate-chloride composition potentially offers a higher PQ boost and greater sensitivity per total weight of additives compared to a conventional calcium chloride treated paper with a 4-8, or even up to 12 Kg/T paper loading. In many applications, the use of a disclosed surface treatment composition will potentially help in controlling the corrosivity of white water in the paper mill. At the same time, in many applications the improved treatment composition boosts inkjet print quality to a greater extent than sizing compositions containing calcium chloride as the only colorant fixative.

Although inkjet printing is employed in many applications of the surface treated papers described herein, it should be understood that in other applications the print media disclosed herein may also be advantageously used in other types of printing or imaging processes, such as printing with pen plotters, imaging with color laser printers or copiers, handwriting with ink pens, offset printing processes, or the like, provided that the toner or ink employed to form the image is compatible with the print media.

Many of the sulfate-chloride containing compositions and production methods disclosed herein also offer the additional benefit of reducing the corrosive effects on some types of paper manufacturing equipment exposed to surface treatment compositions, compared to conventional $CaCl_2$-containing surface treatment during paper manufacturing. The ability to reduce $CaCl_2$ to less than half of the current recommended loading for a ColorLok™ paper (6-7 Kg $CaCl_2$/T) will facilitate ColorLok™ qualification of treated papers. Typically, many papers treated as described herein will perform at ≥1.30 KOD and yet contain less than 6 Kg $CaCl_2$/T (as demonstrated in FIG. 1). For many paper manufacturing/surface treating applications, this feature will be advantageous due to reduced risk of corrosion of some types of paper machines. In paper mills currently running ColorLok™ standards, use of the disclosed sulfate-chloride treatment method will, in many cases, permit a reduction in fresh water consumption without increasing the risk of oxidative-type corrosion for some types of equipment (e.g., containing non-stainless-steel-corrosion-resistant grade parts that come into contacting with salt during the paper manufacturing process).

In some embodiments, a composition for surface treating a raw paper base comprises an aqueous liquid; and a colorant fixative dissolved in the liquid. The colorant fixative comprises a chloride component comprising a divalent chloride salt; and a synergistic amount of a sulfate component comprising a salt having a sulfate anion. The synergistic amount of the sulfate component synergistically enhances at least one print quality parameter of a paper base surface-treated with the composition, compared to a paper base surface-treated with the same composition except lacking the sulfate component.

In some embodiments, the salt having a sulfate anion is selected from the group consisting of calcium sulfate, sodium sulfate and magnesium sulfate. In some embodiments, the composition comprises about 2800 ppm to about 5000 ppm calcium chloride and about 70 ppm to about 150 ppm calcium sulfate.

In some embodiments, a disclosed composition comprises at least one oxygen-containing compound (e.g., polyvinyl alcohol or glycerol) dissolved in the liquid, wherein the dissolved oxygen-containing compound is present in an amount sufficient to enhance dissolution of the sulfate component in the liquid.

In some embodiments, a disclosed composition comprises about 2800 ppm to about 5000 ppm calcium chloride and more than 150 ppm sulfate component.

In some embodiments, a disclosed composition also contains a sizing agent dissolved or dispersed in the aqueous liquid.

In some embodiments, a method of making an inkjet printable media comprises applying an above-described surface treatment composition to the surface of a paper base, and drying the resulting surface-treated paper base, to provide an inkjet printable media containing about 1 Kg/T to about 8 Kg/T chloride component and about 0.01 Kg/T to about 0.5 Kg/T sulfate component per ton of printable media. In some embodiments, the chloride component is calcium chloride in an amount of about 2 Kg/T to about 4 Kg/T and the sulfate component is calcium sulfate in an amount of about 2 g/T to about 150 g/T per ton of printable media.

In some embodiments, an inkjet printable media comprises a paper base and a surface coating on the paper base. The surface coating comprises calcium chloride and a synergistic amount of a sulfate salt. When the printable media is printed with a black pigmented inkjet ink, a KOD value of the printed media is equal to or greater than that of a comparative inkjet printed media containing a surface coating comprising 4-12 kg calcium chloride/T per ton of media and lacking the sulfate salt. In some embodiments, the synergistic amount of sulfate salt is about 0.01 Kg/T to about 0.3 Kg/T per ton of printable media. In some embodiments, the surface coating comprises about 2 Kg/T to about 4 Kg/T calcium chloride per ton of printable media. In some embodiments, the sulfate salt is calcium sulfate, sodium sulfate or magnesium sulfate, or a combination of any of those.

EXAMPLES

The following general methods for assessing print quality are used in the Examples.

Print Density. The black optical density were measured using a reflectance densitometer in units of optical density ("OD"). The method involves printing a solid block of color on the sheet, and measuring the optical density of the printed image. There is some variation in OD depending on the particular printer used and the print mode chosen, as well as the densitometer mode and color setting. The printer used in the tests described herein is a non-commercially available pilot scale printer which uses a HP black pigmented ink jet for the HP T300 printer. The print mode is determined by the type of paper and the print quality selected. For the purposes of the present tests, the default setting of Plain Paper type and Fast Normal print quality print mode was selected. The densitometer used was an X-RITE model 938 spectrodensitometer with a 6 mm aperture. The density measurement settings were Visual color, status T, and absolute density mode. In general, the target optical density for pigment black ("KOD") is equal to or greater than 1.30 in the standard (plain paper, normal) print mode for the HP desktop ink jet printers that use the most common black pigment ink (equivalent to the HP black pigmented ink for the HP T300 printer). Preferably, the KOD is equal to or greater than about 1.40. In some instances, the KOD is equal to or greater than about 1.50. In some instances, the KOD is equal to or greater than about 1.60.

Example 1

Black Optical Density of Print Media Containing Calcium Sulfate and a Reduced Amount of Calcium Chloride Surface treatment compositions containing various amounts of calcium chloride and calcium sulfate were prepared using a Brookfield stirrer at 100 rpm. Calcium chloride was dissolved at room temperature in a 1 L mixture of water and calcium sulfate, to a final concentration of 0.25 wt. % calcium sulfate and a final concentration of 450 ppm, 600 ppm or 700 ppm calcium chloride (corresponding to the three $CaCl_2$ loading amounts shown in FIG. 1 (i.e., about 2750 g/T, 3500 g/T and 4000 g/T media). The solutions were used to surface-treat base paper using Meyer Rod #2 and hand draw down method in the lab. The treated papers were used for print testing, using HP printer with pigmented ink (black) at 40% and/or 62% ink density. Black optical density was measured with Spectro-densitometer Model 938 supplied by X-rite. The setting used was: ANSI status A. The result is reported as an average from 3 measurements.

Comparative compositions containing no Ca-sulfate were also prepared in a similar manner, except calcium sulfate was omitted. Surface treated inkjet print media were prepared by applying the compositions to a paper base by Georgia Pacific wood-free bond paper. By controlling the formulation solids and rod size, an effective pickup weight of surface treatment composition was achieved. The treated sheets were dried with a handheld drier. The samples were printed using a lab-proxy printer with pigmented black inks manufactured by Hewlett-Packard Co., as described above in the General Methods.

In FIG. 1 the KOD response to $CaCl_2$ loading with and without the presence of Ca-sulfate over a $CaCl_2$ loading range of about 2 to 8 Kg/T paper is shown. The amount of Ca-sulfate is 0.1 Kg Ca-sulfate/T paper, which is constrained by Ca-sulfate solubility in aqueous solution at 25° C. The difference (delta) between $CaCl_2$ solution alone (solid triangles) and $CaCl_2$+Ca-sulfate (solid squares) is very significant in that it not only provided a greater print quality boost but it changed the slope of the graph. Although only KOD is demonstrated in FIG. 1, color gamut is expected to follow the same trend line as KOD.

It was surprisingly discovered that the addition of the calcium sulfate to a calcium chloride surface treatment composition does not simply supplement the print quality and dry time effects of the calcium chloride in the treated paper, but instead acts in a synergistic way to significantly enhance the effectiveness of the calcium chloride for crashing pigment and for improving the quality of an inkjet printed image. As shown in FIG. 1, the graph of OD vs. $CaCl_2$ loading demonstrates that when the $CaSO_4$ loading is 0.1 Kg/T paper, the paper performs at 1.30 KOD when the $CaCl_2$ loading is between 2-3 Kg/T paper. At the same $CaSO_4$ loading, the KOD increases to about 1.38 when the $CaCl_2$ loading is about 3.5 Kg/T paper. At the same 0.1 Kg/T $CaSO_4$ loading, the KOD increases to about 1.46 when the $CaCl_2$ loading is increased to about 4 Kg/T paper. In contrast, a 4 Kg/T paper loading of only $CaCl_2$ as the fixing agent, provided a treated paper that performed at about 1.2 KOD which is at least 30% lower than a corresponding paper containing the added 0.1 Kg/T $CaSO_4$. Control papers with $CaCl_2$ loadings between about 6-8 Kg/T paper are unable to perform above about 1.30-1.35 KOD, while papers containing less than 4 Kg/T $CaCl_2$ and 0.1 Kg/T $CaSO_4$ performed at KODs up to about 1.45-1.50. Thus, a paper loaded with half the customary amount of $CaCl_2$ potentially performs the same or better than a commercial paper loaded with 6-8 Kg/T paper $CaCl_2$. Similar synergistic effects are expected with like amounts of other salts containing sulfate anion, including Na sulfate and Mg sulfate.

The results summarized in FIG. 1 showed a very surprising result of the synergestic effect, instead of linear effect, of calcium sulfate and calcium chloride multi-salt performance to boost black optical density. In FIG. 1, the horizontal dashed line at about 1.325 OD represents the common range of user-perceived-excellence in print quality for black optical density (KOD). It can be readily seen that 1.325 KOD is achieved with less than half of the customary salt loading (i.e., 6300 g/T). For many applications, this represents a significant reduction in cost and corrosion risk.

Example 2

Figure 2:
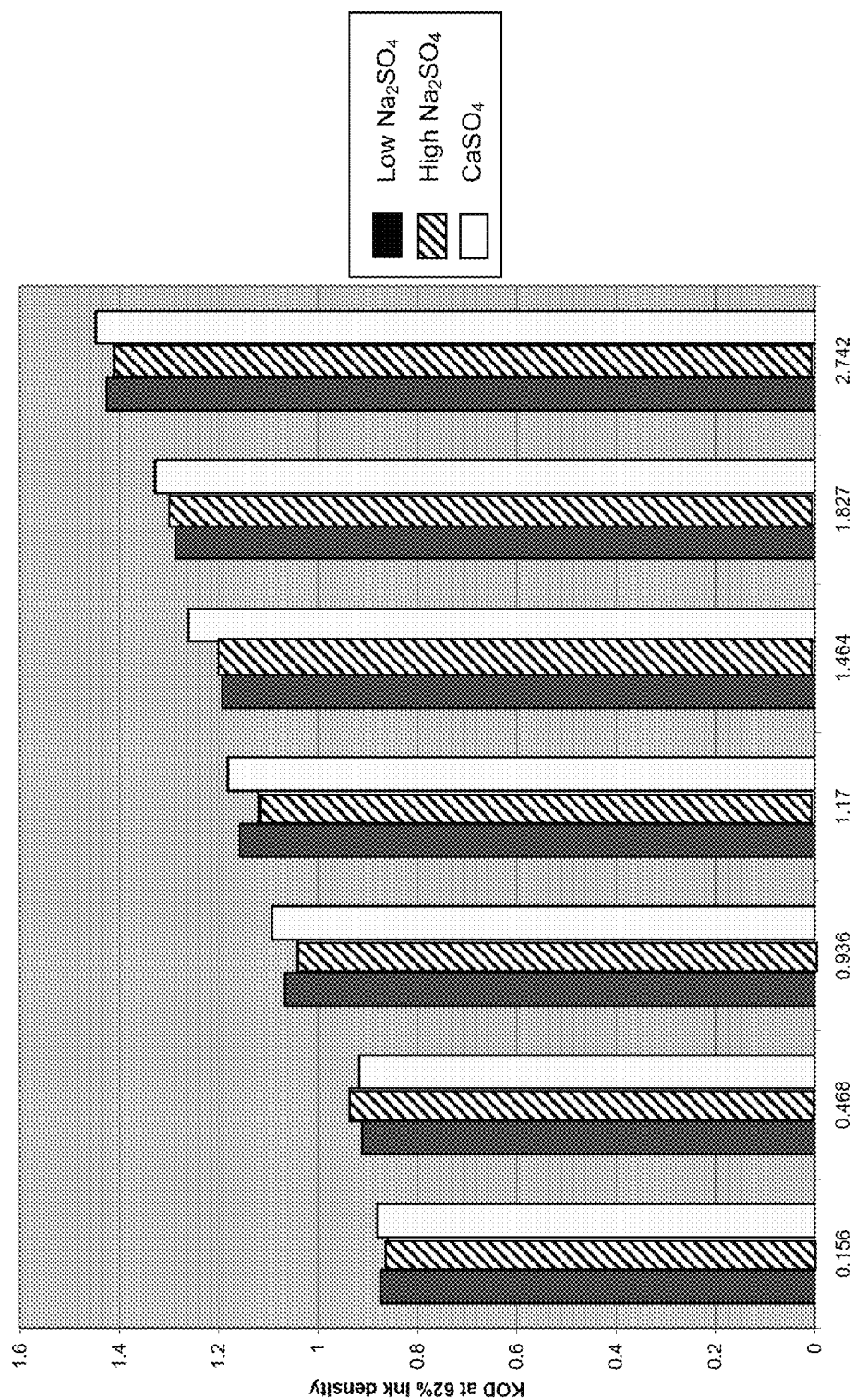
FIG. 2 is a graph showing the KOD values of Na sulfate/Ca chloride and Ca sulfate/Ca chloride at increasing amounts of Ca chloride.

Black Optical Density of Print Media Containing Sodium Sulfate or Calcium Sulfate and Calcium Chloride Na sulfate/Ca chloride and Ca sulfate/Ca chloride treated media sheets were prepared and tested as described in Example 1. KOD is measured at 62% ink density with HP black pigmented ink. FIG. 2 is a graph showing the KOD values of Na sulfate/Ca chloride and Ca sulfate/Ca chloride treated media sheets at increasing amounts of Ca chloride. Low $Na_2SO_4$ is at 0.7% weight in solution. High $Na_2SO_4$ is at 2.8% weight in solution. $CaSO_4$ is at 0.25% weight in solution. This data shows that the black optical density boost from sulfate-containing salts are very comparable between sodium sulfate and calcium sulfate. Accordingly, for some applications sodium sulfate is used instead of calcium sulfate to achieve comparable performance.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A composition for surface treating a raw paper base, comprising:
    an aqueous liquid; and
    a colorant fixative dissolved in said liquid, said colorant fixative comprising:
        a chloride component comprising 2800 ppm to 5000 ppm by weight of a divalent chloride salt; and
        a synergistic amount of a sulfate component comprising a salt having a sulfate anion, wherein said amount of said sulfate component synergistically enhances at least one print quality parameter of a paper base surface-treated with said composition, compared to a paper base surface-treated with said composition lacking said sulfate component;
    wherein the salt having a sulfate anion is calcium sulfate; and
    wherein the composition comprises 2800 ppm to 5000 ppm calcium chloride and about 70 ppm to about 150 ppm calcium sulfate.

2. The composition of claim 1, comprising at least one oxygen-containing compound dissolved in said liquid, wherein said dissolved oxygen-containing compound is present in an amount sufficient to enhance dissolution of said sulfate component in said liquid.

3. The composition of dam 2, wherein said at least one oxygen-containing compound is selected from the group consisting of polyvinyl alcohol and glycerol.

4. The composition of claim 1, comprising a sizing agent dissolved or dispersed in said aqueous liquid.

5. A method of making an inkjet printable media comprising:
    applying the surface treatment composition of any one of claims 1,2,3 and 4 to the surface of a paper base, and
    drying the surface-treated paper base, to provide an inkjet printable media containing about 1 Kg/T to about 8 Kg/T said chloride component and about 0.01 Kg/T to about 0.5 Kg/T said sulfate component per ton of printable media.

6. The method of claim 5, wherein said chloride-containing component is calcium chloride in an amount of about 2 Kg/T to about 4 Kg/T and said sulfate component is calcium sulfate in an amount of about 2 g/T to about 150 g/T per ton of printable media.

* * * * *

UNITED STATES PATENT AND TRADEMARK OFFICE
CERTIFICATE OF CORRECTION

| | | |
|---|---|---|
| PATENT NO. | : 9,056,515 B2 | Page 1 of 1 |
| APPLICATION NO. | : 13/876834 | |
| DATED | : June 16, 2015 | |
| INVENTOR(S) | : Gracy A. Wingkono et al. | |

It is certified that error appears in the above-identified patent and that said Letters Patent is hereby corrected as shown below:

IN THE CLAIMS

In column 12, line 44 approx., in Claim 3, delete "dam" and insert -- claim --, therefor.

Signed and Sealed this
Twenty-second Day of December, 2015

Michelle K. Lee
*Director of the United States Patent and Trademark Office*